US006704311B1

(12) United States Patent
Chuah et al.

(10) Patent No.: US 6,704,311 B1
(45) Date of Patent: Mar. 9, 2004

(54) APPLICATION-LEVEL SWITCHING SERVER FOR INTERNET PROTOCOL (IP) BASED NETWORKS

(75) Inventors: Mooi Choo Chuah, Eatontown, NJ (US); Bharat Tarachand Doshi, Holmdel, NJ (US); Anlu Yan, Eatontown, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/344,781

(22) Filed: Jun. 25, 1999

(51) Int. Cl.[7] ............................................... H04L 12/56
(52) U.S. Cl. ....................................................... 370/389
(58) Field of Search ................................ 370/469, 473, 370/465, 470, 471, 474, 349, 389, 395.5, 395.52, 537, 538, 539, 540

(56) References Cited

U.S. PATENT DOCUMENTS 6,137,869 A * 10/2000 Voit
6,212,190 B1 * 4/2001 Mulligan
6,304,574 B1 * 10/2001 Schoo
6,414,950 B1 * 7/2002 Rai

OTHER PUBLICATIONS

U.S. patent application of Baldwin et al., entitled "A Logical Link Connection Server", Ser. No. 08/839,475, filed on Apr. 14, 1997.

U.S. patent application of Chuah et al., entitled "A Lightweight Internet Protocol Encapsulation (LIPE) Scheme for Multimedia Traffic Transport", Ser. No. 09/264,053, filed on Mar. 9, 1999.

J. Rosenberg, "An RTP Payload Format for User Multiplexing" work–in–progress, draft–ietf–avt–aggregation–00.txt.

B. Subbiah, and S. Sengodan, "User Multiplexing in RTP payload between IP Telephony Gateway", work–in–progress, draft–ietf–avt–mux–rtp–00.txt, Aug. 1998.

H. Schulzrinee and J. Rosenberg, "The IETF Internet Telephone Architecture and Protocols", IEEE Network, May/Jun., 1999, pp. 18–23.

B. Subbiah and Sengodan, QoS for Sessions described by SDP, work–in–progress, draft–rosenberg–mmusic–sipqos–00.txt, May 1999.

* cited by examiner

Primary Examiner—Kwang Bin Yao
(74) Attorney, Agent, or Firm—Matthew J. Hodulik (57) ABSTRACT

An Internet Protocol (IP)-based network incorporates an application level switching server and a number of packet endpoints. A packet endpoint multiplexes application sessions destined for different packet endpoints into one multiplexed session that is terminated with the application level switching server. The latter extracts each application session (or packets associated therewith) and repackages, or switches, them into other multiplexed sessions such that at least two switched packets are transmitted to different packet endpoints. The multiplexed sessions utilize either RTP/UDP/IP or UDP/IP encapsulation.

16 Claims, 7 Drawing Sheets

LIGHTWEIGHT IP ENCAPSULATION PACKET

FIG. 5

MULTIPLEXING HEADER (MH)

FIG. 6

LIGHTWEIGHT IP ENCAPSULATION PACKETS

| PACKET HEADER | DESTINATION | TYPE OF SERVICE (ToS) | DESTINATION PORT ID (DPI) |
|---|---|---|---|
| mPH1 | FSU 240 | ToS1 | 241 |
| mPH2 | FSU 245 | ToS1 | 246 |
| mPH3 | FSU 240 | ToS1 | 241 |
| mPH4 | FSU 245 | ToS1 | 246 |
| mPH5 | FSU 240 | ToS1 | 241 |
| mPH6 | FSU 245 | ToS1 | 246 |

FIG. 10

UNICAST MULTIPLEXED APPLICATION SESSION 206

| Field |
|---|
| BS 205 IP ADDRESS (SOURCE IP ADDRESS) |
| ALSS 230 IP ADDRESS (DESTINATION IP ADDRESS) |
| TOS 1 (TYPE OF SERVICE) |
| mPH 1 (MINI-PACKET HEADER CALL 1) |
| PAYLOAD 1 (CALL 1) |
| mPH 3 (MINI-PACKET HEADER CALL 3) |
| PAYLOAD 3 (CALL 3) |
| mPH 2 (MINI-PACKET HEADER CALL 2) |
| PAYLOAD 2 (CALL 2) |
| mPH 4 (MINI-PACKET HEADER CALL 4) |
| PAYLOAD 4 (CALL 4) |
| CHECKSUM |

FIG. 11

UNICAST MULTIPLEXED APPLICATION SESSION 211

| Field |
|---|
| BS 210 IP ADDRESS (SOURCE IP ADDRESS) |
| ALSS 230 IP ADDRESS (DESTINATION IP ADDRESS) |
| TOS 1 (TYPE OF SERVICE) |
| mPH 5 (MINI-PACKET HEADER CALL 5) |
| PAYLOAD 5 (CALL 5) |
| mPH 6 (MINI-PACKET HEADER CALL 6) |
| PAYLOAD 6 (CALL 6) |
| CHECKSUM |

FIG. 12

UNICAST MULTIPLEXED APPLICATION SESSION 241

| Field |
|---|
| ALSS 230 IP ADDRESS (SOURCE IP ADDRESS) |
| FSU 240 IP ADDRESS (DESTINATION IP ADDRESS) |
| TOS 1 (TYPE OF SERVICE) |
| mPH 1 (MINI-PACKET HEADER CALL 1) |
| PAYLOAD 1 (CALL 1) |
| mPH 3 (MINI-PACKET HEADER CALL 3) |
| PAYLOAD 3 (CALL 3) |
| mPH 5 (MINI-PACKET HEADER CALL 5) |
| PAYLOAD 5 (CALL 5) |
| CHECKSUM |

UNICAST MULTIPLEXED APPLICATION SESSION 246

| Field |
|---|
| ALSS 230 IP ADDRESS (SOURCE IP ADDRESS) |
| FSU 245 IP ADDRESS (DESTINATION IP ADDRESS) |
| TOS 1 (TYPE OF SERVICE) |
| mPH 2 (MINI-PACKET HEADER CALL 2) |
| PAYLOAD 1 (CALL 2) |
| mPH 4 (MINI-PACKET HEADER CALL 4) |
| PAYLOAD 4 (CALL 4) |
| mPH 6 (MINI-PACKET HEADER CALL 6) |
| PAYLOAD 6 (CALL 6) |
| CHECKSUM |

APPLICATION-LEVEL SWITCHING SERVER FOR INTERNET PROTOCOL (IP) BASED NETWORKS

BACKGROUND OF THE INVENTION (1) Field of the Invention

This invention relates generally to communications and, more particularly, to packet communications systems.

(2) Background Art

As the Internet evolves, a variety of new services have been defined for Internet Protocol (IP) based technology. These include "Integrated services" (such as controlled load service and guaranteed service) and "differentiated services." Based on these services, an IP-based network is able to carry multimedia traffic, including voice, data and video, within various performance requirements.

Unfortunately, the very size of the underlying packet payload of some multimedia traffic may cause performance problems. In particular, voice packets are in general quite small. ITU-T G723.1 specifies generation of a 20 byte speech packet at 30 ms intervals (e.g., see ITU-T Recommendation G.723.1 *"Dual Rate Speech Coder for Multimedia Communications Transmitting At 5.3 and 6.3 Kbps,"* 1995). Consequently, packets used to transport voice are subjected to a large overhead. For example a 20-byte voice packet transmitted using a User Datagram Protocol/Internet Protocol (UDP/IP) encapsulation incurs an overhead of 28 bytes (20 byte IP header, plus up to 8 bytes of UDP header), or 140%. If using Real Time Protocol (RTP)/UDP/IP encapsulation, the overhead is 40 bytes (12+8+20), or 200%. In addition, if each application session (also referred to herein as an audio stream, or packet flow, or call), requires use of one UDP port number, the resulting large number of packets may create heavy packet processing load for any intermediate routers and available. Further, there are a finite number of UDP port numbers, which may also be a limiting factor on the available number of sessions.

As such, various multiplexing schemes have been proposed to address the bandwidth efficiency problem caused by small payloads carried by packets with relatively large headers over an IP-based network (e.g., see J. Rosenberg, *"An RTP Payload Format for User Multiplexing,"* work in progress, drafi-ietf-avt-aggregation-00.txt; and B. Subbiah, S. Sengodan, *"User Multiplexing in RTP payload between IP Telephony Gateway,"* work in progress, draft-ietf-avt-mux-rtp-00.txt, August 1998; the co-pending, commonly assigned, U.S. Patent application of Chuah et al. entitled "A Lightweight Internet Protocol Encapsulation (LIPE) Scheme for Multimedia Traffic Transport," application Ser. No. 09/264,053, filed on Mar. 9, 1999). These schemes propose different. ways to multiplex multimedia traffic (e.g., voice packets) from different, calls using a single multiplexing session using IP-based encapsulation (an RTP/UDP/IP session in the former two articles, or a UDP/IP session in the latter patent application) between two packet endpoints of an IP network.

Figure 1:
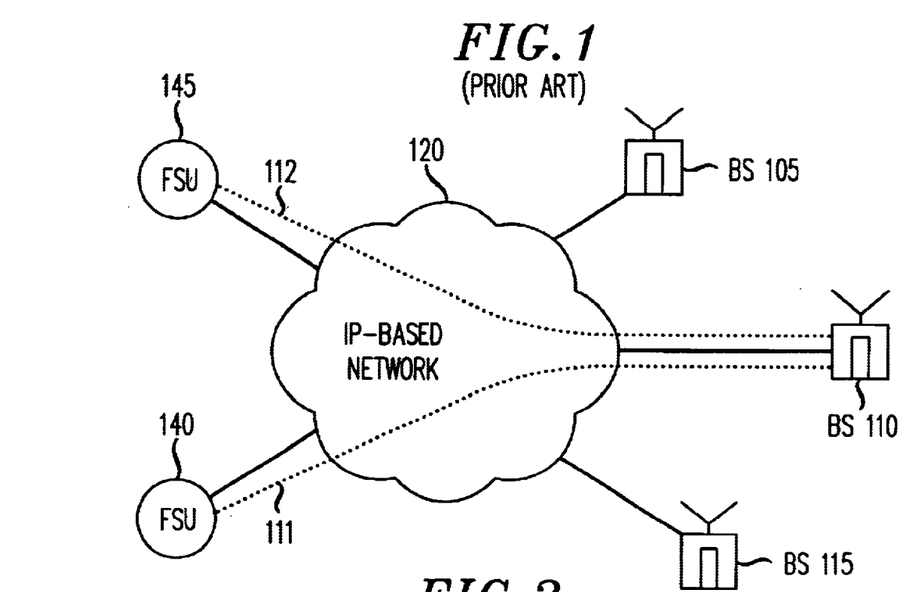
FIG. 1 shows a portion of a prior art mobile communications system.
Figure 2:
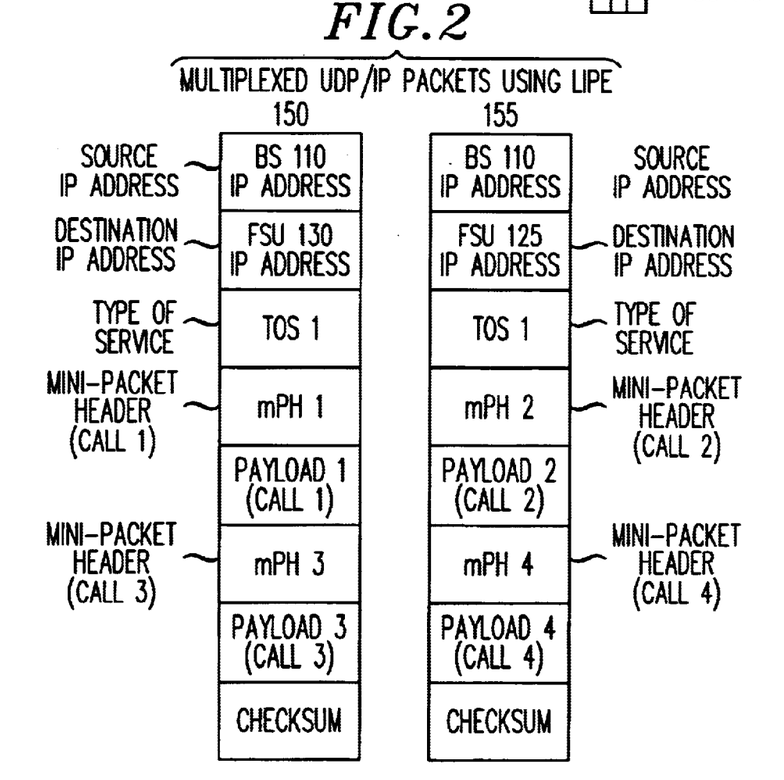
FIG. 2 shows two illustrative UDP/IP multiplexed packet sessions using LIPE.

These multiplexing schemes are efficient when large numbers of application sessions originate and terminate between the same pair of packet endpoints (or IP interfaces). However, if traffic dispersion occurs, there may be a decrease in multiplexing efficiency. In particular, when different pairs of packet endpoints are involved, the number of application sessions multiplexed into a particular multiplexing session may decrease and therefore result in the degradation of multiplexing efficiency. This is observable from FIG. 1, which illustrates the use of an IP-based network 120 to provide transport between a number of wireless base stations (105, 110, and 115) and a number of frame selector units (FSUs 140 and 145) as known in the art. The solid lines between these packet endpoints and the IP-based network 120 are representative of well-known communications facilities. A base station (BS) (105, 110, and 115) may handle calls that go to any one of a number of FSUs (as illustrated by FSUs 140 and 145). This is shown for BS 110, which sources traffic that must be split into two multiplexed sessions 111 and 112 (dotted lines) between FSUs 140 and 145, respectively. Consequently, not much multiplexing gain can be achieved by using multiplexing session 111 between BS 110 and FSU 140. This is also illustrated in FIG. 2, which shows a corresponding view of the two multiplexed UDP/IP application sessions using the above-mentioned LIPE. In this context, assume that BS 110 handles calls 1, 2, 3, and 4 and that calls 1 and 3 are destined for FSU 140 and that calls 2 and 4 are destined for FSU 145. This requires two multiplexed UDP/IP application sessions: 150 and 155. Application session 150 multiplexes payloads for calls 1 and 3, while application session 155 multiplexes payloads for calls 2 and 4. Similarly, an FSU may be sourcing traffic that is split among different multiplexed sessions to the BSs (e.g., 105, 110, and 115) and be similarly underutilized.

SUMMARY OF THE INVENTION

An application level switching server is used within an IP-based network to counter any multiplexing gain, loss due to traffic dispersion. The application level switching server receives a stream of mini-packets encapsulated within a larger Internet Protocol based (IP) packet, where the larger IP based packet is associated with a first multiplexed session and each mini-packet is associated with a particular application session. In accordance with the invention, the application level switching server routes each received mini-packet as a function of routing information that associates header information from each received mini-packet with another multiplexed session such that mini-packets within a multiplexed session can be routed to different multiplexed sessions. As a result, application sessions associated with the first multiplexed session are re-packed into other multiplexed sessions.

In an embodiment of the invention, an IP-based network incorporates an application level switching server and a number of packet endpoints. A packet endpoint multiplexes application sessions destined for different packet endpoints into one multiplexed session that is terminated with the application level switching server. The latter extracts each application session (or packets associated therewith) and repackages, or switches, them into other multiplexed sessions such that switched packets are transmitted to different packet endpoints. The multiplexed sessions utilize either RTP/UDP/IP or UDP/IP encapsulation.

BRIEF DESCRIPTION OF THE DRAWING

FIGS. 10, 11 and 12 illustrate multiplexed sessions in accordance with the inventive concept;

DETAILED DESCRIPTION

Figure 3:
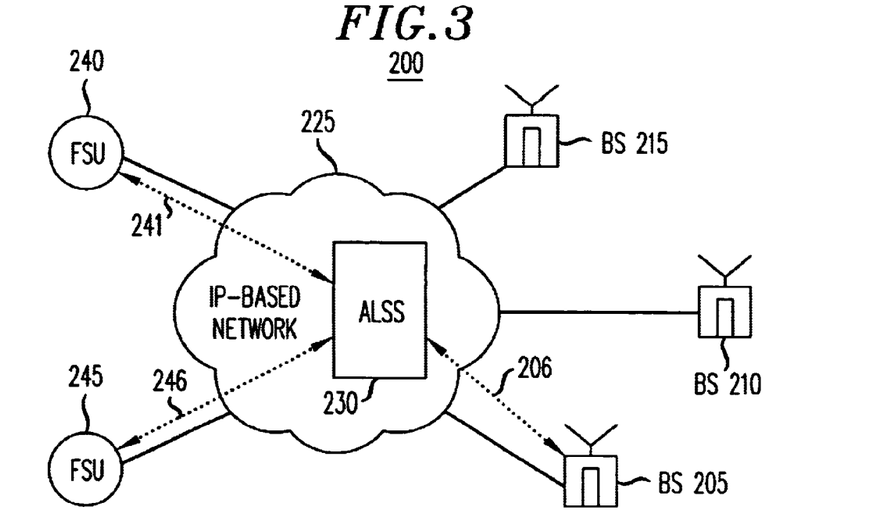
FIG. 3 shows a portion of a mobile communications system embodying the principles of the invention.

A portion of a CDMA-based mobile communications system 200 embodying the principles of the invention is shown in FIG. 3. Portion 200 comprises FSUs 240 and 245, which (among other things) provide call processing; three BSs: 205, 210 and 215; IP-based network 225; and, in accordance with the inventive concept, application level switching server (ALSS) 230 (which is illustratively a part of IP-based network 225). (Since it is not necessary to the inventive concept, the wireless endpoints of this CDMA-based mobile communications systemare not shown, nor described, herein.) Other than the inventive concept, the elements shown in FIG. 3 are well-known and will not be described in detail. For example, although shown as a single block element, BS 205 includes stored-program-control processors, memory, and appropriate interface cards. Also, IP-based network 225 is representative of any Internet-Protocol based network infrastructure and includes, besides ALSS 230, other components (not shown) such as routers, etc., for communicating IP packets between packet endpoints, which are represented by BSs 205, 210 and 215; and FSUs 240 and 245. Likewise, the solid lines between the packet endpoints and IP-based network 225 are representative of well-known communications facilities, e.g., asynchronous transfer mode (ATM) over a synchronous optical network (SONET), etc. It is assumed that IP-based network 225 provides certain resource guarantees with respect to bandwidth, delay and loss (not shown). Except as noted below, it is assumed that the CDMA-based mobile communications system conforms to industry standard IS-95.

In accordance with the inventive concept, an application level switching server (ALSS) is used within an IP-based network to counter any multiplexing gain loss due to traffic dispersion. As shown in FIG. 3, IP-based network 225 incorporates ALSS 230 (described further below). Each packet endpoint multiplexes application sessions destined for different packet endpoints into one multiplexed session with ALSS 230. This is illustrated by single multiplexed session 206 (dotted line) between BS 205 and ALSS 230. The latter extracts each application session and repackages it into another multiplexing session with its respective destination packet endpoint. This is illustrated by the repacking of single multiplexed session 206 into multiplexed sessions 241 and 246 associated with FSU 240 and FSU 245, respectively. For illustration purposes only, the remainder of this description assumes that multiplexed sessions utilize UDP/IP encapsulation of LIPE packets (other techniques, such as RTP/UDP/IP, could also be used).

LIPE

Figure 4:
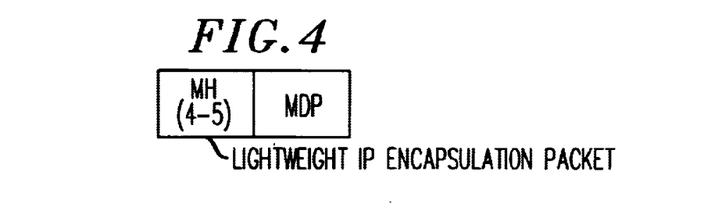
FIG. 4 shows an illustrative LIPE packet format.
Figure 5:
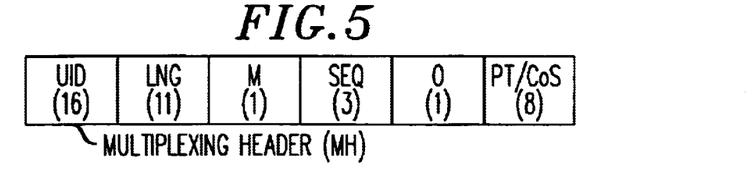
FIG. 5 shows an illustrative format for the multiplexing header (MH) portion of the LIPE packet of FIG. 4.

Before continuing to describe the inventive concept, a brief overview of UDP/IP encapsulated LIPE packets is provided. FIG. 4 shows an illustrative format of an LIPE packet. LIPE is designed to support multimedia traffic (e.g., voice, video, data). For each incoming data packet (not shown) there is at least one multimedia data packet (MDP) and a corresponding multiplexing header (MH), which has a length of 4 or 5 bytes. An illustrative format for an MH is shown in FIG. 5. The Multiplexing Header (MH) comprises the following fields:

a user identifier (UID) field comprising 16 bits—this allows up to 65536 applications to be multiplexed into a single UDP/IP session;

a length indicator (LNG) field comprising 11 bits—this allows a maximum MDP size of 2048 bytes;

a "more" (M) field comprising 1 bit;

a sequence number (SEQ) field comprising 3 bits—this is used to identify packets within a certain time window;

an optional header indicator (O) field comprising 1 bit—this field is used to indicate whether the optional part of the header, the PT/CoS field is present; and an optional payload type/class of service (PT/CoS) field comprising 8 bits.

If an incoming data packet is larger than 2048 bytes, it is carried by multiple MDPs in the same UDP packet. In this case, the above-mentioned M field is used to indicate that there is data in each of the following MDPs. In particular, each of the corresponding MHs—except the last one—set its M bit to 1.

The optional PT/CoS field is further partitioned into a 3 bit PT field (not shown) and a 5 bit CoS field (not shown). The PT field is used to identify the payload type. For example, different voice sources may use different codecs to encode voice packets and, in this context, the PT field identifies the codec type. The five bit CoS field is available to identify the desired class of service of the MDP.

Figure 6:
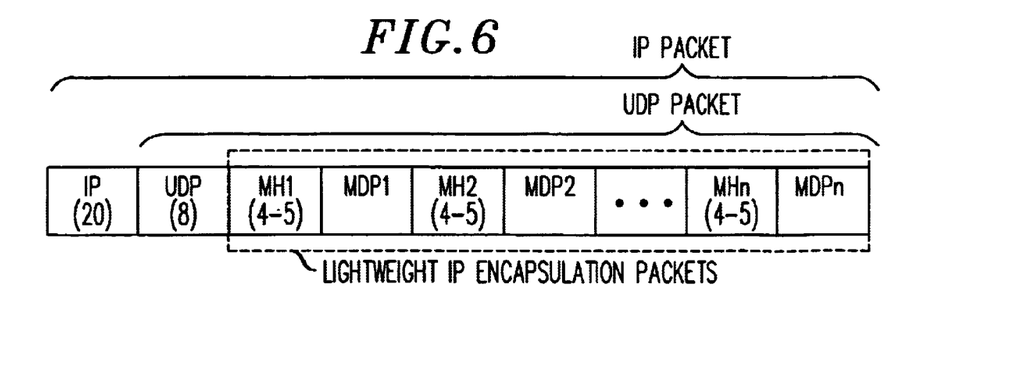
FIG. 6 shows UDP/IP LIPE encapsulation.

As shown in FIG. 6, LIPE uses UDP/IP (as known in the art) as transport. Encapsulated LIPE packets are preceded by a 20 byte IP header and an 8 byte UDP header. It should be noted that in LIPE no field is provided in the header for error checking because the UDP checksum provides payload error detection. The UDP header includes UDP packet length information (not shown), which fixes the overall length of the encapsulated LIPE packets.

Application Level Switching Server (ALSS)

Figure 7:
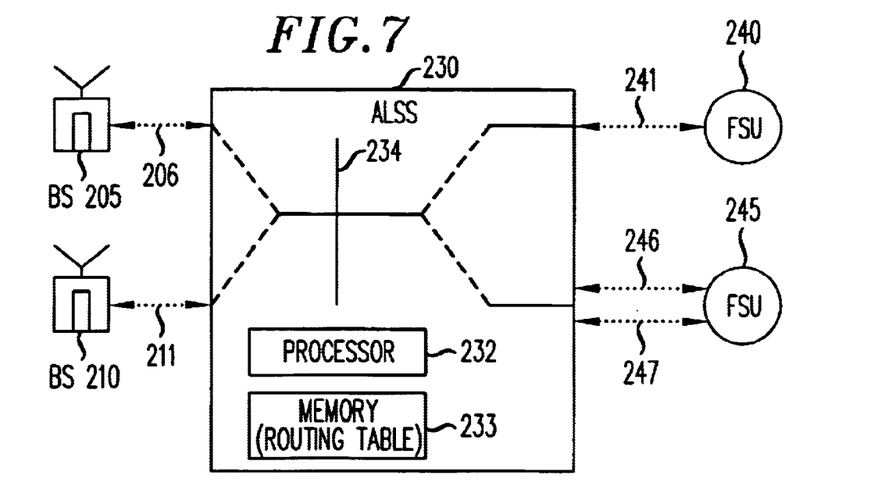
FIG. 7 shows in illustrative block diagram of ALSS 230 of FIG. 3.
Figure 8:
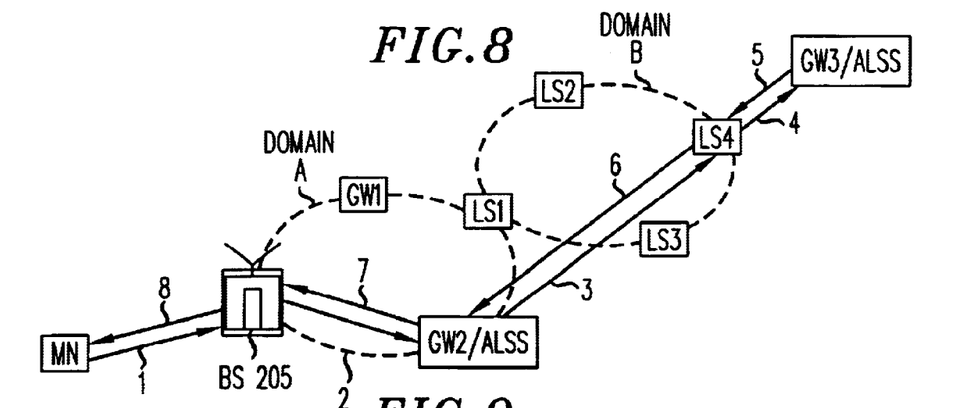
FIG. 8 shows an illustrative method for forming a routing table.

Turning now to FIG. 7, a portion of FIG. 3 has been re-drawn to further illustrate the inventive concept. Reference should also be made at this time to FIGS. 8, 9, 10, 11 and 12. As noted above, and in accordance with the invention, BS 205 provides a unicast multiplexed session 206 to ALSS 230 notwithstanding the fact that some of the mini-packets within the session are destined for different packet endpoints. Similarly, BS 210 provides multiplexed session 211. ALSS 230 is a router, as known in the art, modified in accordance with the inventive concept. Only that portion of ALSS 230 related to the inventive concept is shown. As such, ALSS 230 comprises a stored-program-controlled-processor (hereafter referred to as processor 232) and a memory 233. (It is presumed that ALSS 230 is suitably programmed to carry out the below-described method using conventional programming techniques, which, as such, will not be described herein.)

It is assumed that the Session Initiation Protocol (SIP), as known in the art, is used to initiate a session between users, or packet endpoints. During a call setup, ALSS 230 monitors SIP protocol messages that are routed through it and forms an application session routing table for storage in memory 233. For example, consider the illustrative network shown in FIG. 8. This network comprises two domains, domain A and domain B. It is assumed that domain A comprises base station 205, an Internet Telephone Gateway, as known in the art) (GW1), a location server (LS1), and an Internet Telephone Gateway which is co-located with an ALSS (GW2/ALSS) (e.g., ALSS 230). Domain B comprises location servers LS1, LS2, LS3, LS4 and gateway GW3/ALSS (also co-located with an ALSS). (As can be observed, LS1 resides in both domains). As known in the art, within a domain a location server can find out the locations of all of the gateways by using any intra-domain protocol such as the IETF service location protocol. (e.g., see J. Veizades et al., "Service Location Protocol" IETF RFC2165, June 1997). It is also known in the art that location servers in different domains (such as domain A and domain B of FIG. 8) can exchange information on how phone numbers can be reached by using an inter-domain protocol such as the Gateway location protocol (e.g., see M. Squire, "Gateway Location Protocol," work in progress, internet draft, IETF February, 1999). As such, when initiating a call, a user at a mobile node (such as MN in FIG. 8) sends an SIP request to GW2/ALSS via base station 205 (messages 1 and 2 of FIG. 8). GW2/ALSS uses its intra-domain location server (LS1) to find out which destination location server to talk to using the above-mentioned service location protocol. GW2/ALSS then proxies this request (message 3) to the identified destination server (in this example, LS4). The latter (LS4) proxies the request (message 4) to the destination gateway, here GW3/ALSS. GW3/ALSS provides an SIP response (message 5) to LS4, which delivers the SIP response to GW2/ALSS (message 6). GW2/ALSS delivers the SIP response to the MN (messages 7 and 8). In this manner, GW2/ALSS (e.g., ALSS 230) monitors SIP messages and forms a routing table.

Figure 9:
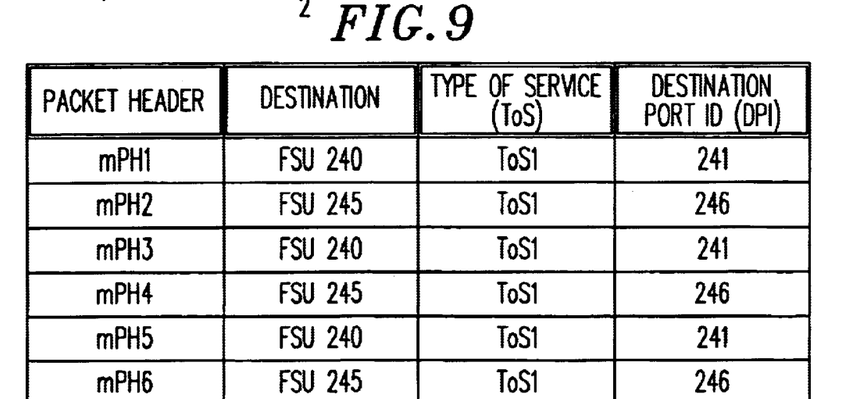
FIG. 9 shows an illustrative routing table for use in ALSS 230 of FIG. 3.

An illustrative application session routing table is shown in FIG. 9. For each received mini-packet header (mPH) there is a corresponding destination packet endpoint, Type of Service (ToS) and destination port ID (DPI) (which identifies the UDP session). For example, BS 205 sets up a call, referred to, as "call 1" via the above-mentioned SIP protocol. This signaling includes mPH information. ALSS 230 monitors this signaling and associates an mPH1 (i.e., call 1) with FSU 240, which has a ToS of 1 (here shown as ToS1), and is associated with multiplexed session 241 (since there may be more than one multiplexed session with the same packet endpoint (here, FSU 240)). Similarly, when BS 205 sets up "call 2," "call 3," and "call 4" similar information is entered into the application session routing table of FIG. 9.

During actual transmission of the bearer traffic for the call, BS 205 provides to ALSS 230 multiplexed session 206, which is shown in FIG. 10. (As noted above, BS 205 forms a multiplexed session using UDP/IP encapsulation of LIPE packets. However, to illustrate the generality of the inventive concept, general terms such as "mini-packet header (mPH)" etc. are used in the FIGS. Obviously, with reference to FIG. 4, an mPH corresponds the MH field of an LIPE packet, etc.) As can be observed from FIGS. 9 and 10, multiplexed session 206 includes call traffic that is destined for different packet endpoints, e.g., call 1 and call 3 are destined for FSU 240 while call 2 and call 4 are destined for FSU 245. Similarly, multiplexed session 211, of BS 210, is shown in FIG. 11.

Upon receiving multiplexed sessions 206 and 211, ALSS 230 extracts the individual sessions and repackages, or rebundles, them into the UDP/IP multiplexed sessions indicated by the application routing table of FIG. 9. In this example, ALSS 230 provides multiplexed session 241, which is destined for FSU 240, and multiplexed session 246, which is destined for FSU 245. Multiplexed sessions 241 and 246 are shown in FIG. 12. As can be observed from the application routing table of FIG. 9, incoming packet headers are mapped to a particular UDP session and associated ToS. As such, the inventive concept supports multiple UDP sessions with different ToS between an ALSS and the same packet endpoint. For example, a second multiplexed session, e.g., 247 (not shown), could be set up between ALSS 230 and FSU 245 to support a "ToS2" type of service (not shown).

Figure 13:
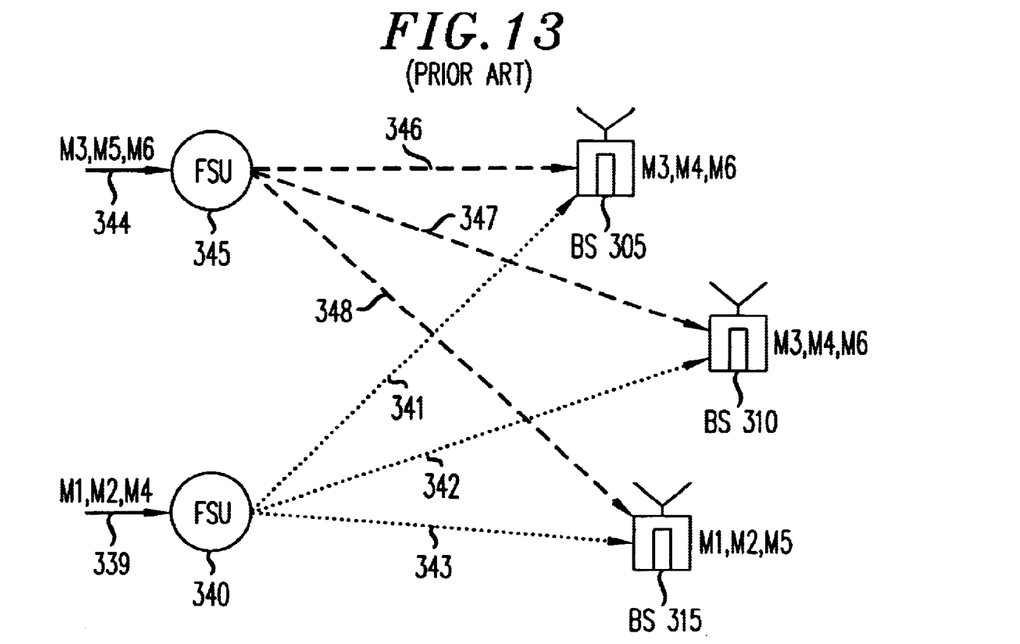
FIG. 13 shows a portion of a prior art mobile communications system performing multicasting.
Figure 14:
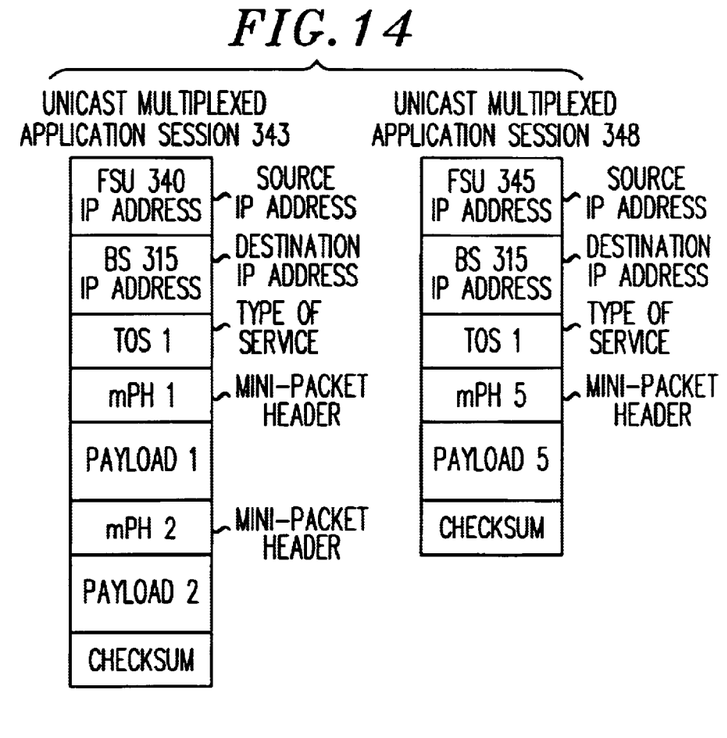
FIG. 14 shows two illustrative UDP/IP multiplexed packet sessions using LIPE.

Notwithstanding the above description with respect to unicast multiplexed sessions, the inventive concept is also applicable to multicasting of packets. FIG. 13 illustrates one prior art approach to multicasting. In the communications network illustrated in FIG. 13, it is assumed that each FSU is connected to a corresponding base station via a point-to-point connection (not shown) which coveys multiplexed sessions (dashed lines represent the multiplexed sessions between FSU 345 and BSs 305, 310, and 315, while dotted lines represent the multiplexed sessions between FSU 340 and BSs 305, 310, and 315). FSU 340 receives multicast packets M1, M2 and M4, via connection 339, for transmission to one or all of the base stations. In particular, as shown in FIG. 13, multiplexed session 341 conveys M4 to BS 305; multiplexed session 342 conveys M2 and M4 to BS 310; and multiplexed session 343 conveys M1 and M2 to BS 315. Similarly, FSU 345 receives muitcast packets M3, M5 and M6, via connection 344, for transmission to one or all of the base stations. In this example, and as shown in FIG. 13, multiplexed session 346 conveys M3 and M6 to BS 305; multiplexed session 347 conveys M6 to BS 310; and multiplexed session 348 conveys M5 to BS 315. As such, each multiplexed session may be underutilized. This is illustrated in FIG. 14, which shows illustrative packet formats for multiplexed sessions 343 (which only carries two payloads) and 348 (which only carries one payload).

Figure 15:
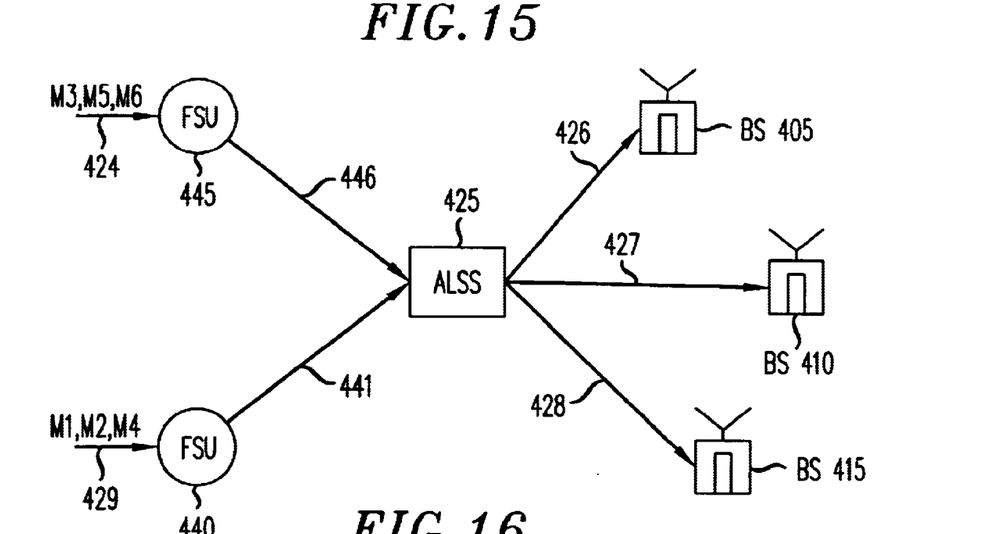
FIG. 15 shows another embodiment of the inventive concept.
Figure 16:
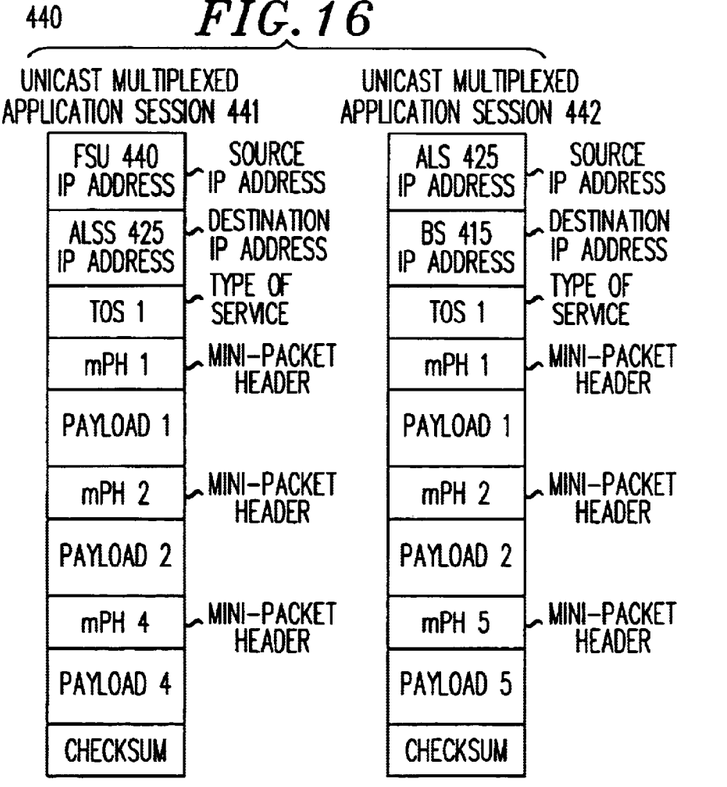
FIG. 16 illustrates multiplexed sessions in accordance with the inventive concept.

However, and in accordance with the inventive concept, an ALSS also handles multiplexing multicast packets within one UDP multiplexed session. An illustrative communications network is illustrated in FIG. 15. Each FSU (440 and 445) is connected to ALSS 425 via a point-to-point connection (not shown) which coveys multiplexed sessions 441 and 446 (solid lines represent the multiplexed sessions between the FSUs (440 and 445) and ALSS 425). As described earlier, ALSS 425 develops a routing table (not shown). In accordance with the inventive concept, ALSS 425 receives multicast packets M1, M2 and M4, via multiplexed session 441 (an illustrative packet format is also shown in FIG. 16). Similarly, ALSS 425 receives multicast packets M3, M5 and M6, via multiplexed session 446. ALSS 425 then forms multiplexed sessions to carry all multicast packets destined to a particular base station (which are connected via point-to-point connections (not shown)). In this example, ALSS 425 forms multiplexed sessions 426, 427 and 428. An illustrative packet format is shown for multiplexed session 428 in FIG. 16. As can be observed from FIG. 16, the presence of ALSS 425 results in increased multiplexing gain. (Although the above was described in the context of point-to-point connections between an ALSS and the base stations, other approaches are possible. For example, an ALSS can be coupled to an intermediate node (not shown) which then multicasts traffic to a plurality of base stations.)

Figure 17:
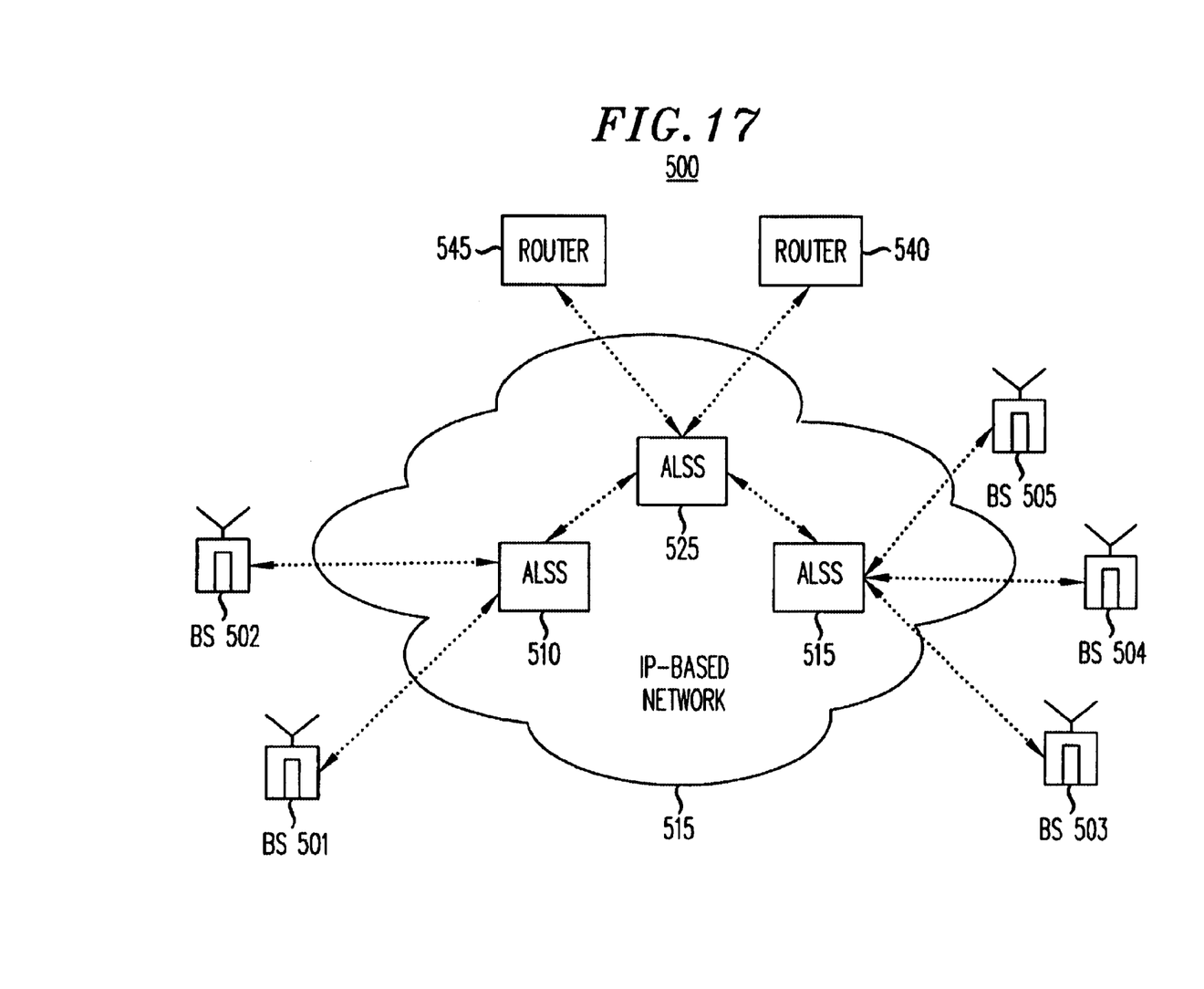
FIG. 17 shows another embodiment of the inventive concept.

Another illustrative communications network utilizing the inventive concept is shown in FIG. 17. In this illustration, there are hierarchical layers of ALSS's. Multicast traffic from various sessions is fed to the highest ALSS layer (here represented by ALSS 525) and multiplexed over one single point-to-point virtual circuit (VC) to the next layer of ALSS's (here represented by ALSS 510 and ALSS 515). At the lowest layer, there is a shared medium (e.g., Ethernet) to multicast the traffic to multiple base stations (e.g., from ALSS 510 to BS 501 and BS 502). The presence of a hierarchy of ALSSs provides the basis for an approach that is more flexible and scalable. In addition, this approach can be extended to have multiple (but few) VCs between ALSS's to provide different quality of services. (It should be noted that the ALSS's in this case need to have an IP layer but do not have to run IP routing protocols.)

The foregoing merely illustrates the principles of the invention and it will thus be appreciated that those skilled in the art will be able to devise numerous alternative arrangements which, although not explicitly described herein, embody the principles of the invention and are within its spirit and scope.

Further, although illustrated in the context of CDMA, the inventive concept is applicable to any wireless system (e.g., UMTS, etc.) or application that requires real-time multiplexing of data streams. Also, although the inventive concept was described above in the context of FSUs, in a more general setting, FSUs may be just routers and the inventive concept still applies.

What is claimed is:

1. A method for use in a packet endpoint, the method comprising the step of:
   receiving a stream of mini-packets encapsulated within a larger Internet Protocol based (IP) packet, the larger IP based packet associated with a first multiplexed session, each mini-packet associated with a particular application session, wherein each mini-packet may pertain to a different user;
   routing each received mini-packet as a function of application layer routing information that associates header information from each received mini-packet with an other multiplexed session such that at least two mini-packets are routed to different multiplexed sessions whereby application sessions associated with the first multiplexed session are re-packed into other multiplexed sessions, wherein said header information includes a reduced size header relative said IP based packet including user identification information and not including a destination address.

2. The method of claim 1 wherein the larger packet is formatted in accordance with a User Datagram Protocol/Internet Protocol (UDP/IP).

3. The method of claim 1 wherein the mini-packet is formatted in accordance with a lightweight encapsulation protocol (LIPE).

4. The method of claim 3 wherein the larger packet is formated in accordance with Real Time Protocol/User Datagram Protocol/Internet Protocol (RTP/UDP/IP).

5. The method of claim 1 further comprising the step of updating the routing information by monitoring signaling information related to the setting up of the particular application session prior to the routing step.

6. The method of claim 1 wherein the routing step comprises the steps of:
   recovering header information from each received mini-packet;
   indexing a routing table to recover an associated destination IP address, type of service, and multiplexed session for routing each received mini-packet to its associated multiplexed session.

7. The method of claim 1, wherein the mini packets correspond to voice packets.

8. An improved router for use in an Internet Protocol (IP) based packet network comprising a plurality of base stations and a plurality of packet endpoints wherein each base station communicates application session information with at least two of the packet endpoints, the improvement comprising:
   a memory for storing routing information; and
   a processor for processing a received stream of mini-packets encapsulated within a larger Internet Protocol based (IP) packet, the larger IP based packet associated with a multiplexed session between the improved router and one of the plurality of base stations, each mini-packet associated with a particular application session, wherein each mini-packet may pertain to a different user, wherein the processing re-packs each received mini-packet into other multiplexed sessions which are associated with the at least two packet endpoints,
   wherein the re-packing is performed as a function of application layer routing information, which associates header information from each received mini-packet with the respective multiplexed session associated with one of the at least two packet endpoints, wherein said header information includes a reduced size header relative said IP based packet including user identification information and not including a destination address.

9. The improved router of claim 8 wherein the larger packet is formatted in accordance with a User Datagram Protocol/Internet Protocol (UDP/IP).

10. The improved router of claim 8 wherein the mini-packets are formatted in accordance with a lightweight encapsulation protocol (LIPE).

11. The improved router of claim 8 wherein the larger packet is formatted in accordance with Real Time Protocol/User Datagram Protocol/Internet Protocol (RTP/UDP/IP).

12. The improved router of claim 8 wherein the processor updates the routing information of mini-packets by monitoring signaling information related to the setting up of the particular application session.

13. The improved router of claim 8 wherein the routing information associates a particular value of received mini-packet header information with a destination IP address of one of the packet endpoints, type of service, and corresponding multiplexed session.

14. The router of claim 8, wherein the mini packets correspond to voice packets.

15. A method for use in a packet endpoint, the method comprising the steps of:
   receiving a stream of mini-packets encapsulated within a larger Internet Protocol based (IP) packet, the larger IP based packet associated with a first multiplexed session, each mini-packet associated with a particular application session;
   routing each received mini-packet as a function of routing information that associates header information from each received mini-packet with an other multiplexed session such that at least two mini-packets are routed to different multiplexed sessions whereby application sessions associated with the first multiplexed session are re-packed into other multiplexed sessions, wherein the mini-packet is formatted in accordance with a lightweight encapsulation protocol (LIPE).

16. An improved router for use in an Internet Protocol (IP) based packet network comprising a plurality of base stations and a plurality of packet endpoints wherein each base station communicates application session information with at least two of the packet endpoints, the improvement comprising:
   a memory for storing routing information; and
   a processor for processing a received stream of mini-packets encapsulated within a larger Internet Protocol based (IP) packet, the larger IP based packet associated with a multiplexed session between the improved router and one of the plurality of base stations, each mini-packet associated with a particular application session, wherein the processing re-packs each received mini-packet into other multiplexed sessions which are associated with the at least two packet endpoints,
   wherein the re-packing is performed as a function of the routing information, which associates header information from each received mini-packet with the respective multiplexed session associated with one of the at least two packet endpoints, wherein the mini-packets are formatted in accordance with a lightweight encapsulation protocol (LIPE).

* * * * *